United States Patent [19]

Moe et al.

[11] 4,237,631
[45] Dec. 9, 1980

[54] PICTURE FRAME

[75] Inventors: Walter Moe; Lawrence A. Bernstein, both of Los Angeles, Calif.

[73] Assignee: Diker Moe Associates, West Los Angeles, Calif.

[21] Appl. No.: 9,587

[22] Filed: Feb. 5, 1979

[51] Int. Cl.³ .............................................. G09F 1/12
[52] U.S. Cl. ..................................... 40/155; 40/152.1; 40/605; 403/402
[58] Field of Search ...................... 40/155, 152, 152.1, 40/154, 156, 158 A, 209, 605; 403/401, 402; 46/16, 17, 23, 26

[56] References Cited

U.S. PATENT DOCUMENTS

| 3,189,136 | 6/1965 | Stickney | 40/155 X |
|---|---|---|---|
| 3,218,747 | 11/1965 | Cornfield | 40/152.1 |
| 3,528,192 | 9/1970 | Meates | 46/16 |
| 3,990,168 | 11/1976 | Murray | 40/152 |
| 4,017,989 | 4/1977 | Murray | 40/605 |
| 4,038,770 | 8/1977 | Bott | 40/209 |
| 4,055,910 | 11/1977 | Schmidt | 40/155 |
| 4,161,977 | 6/1979 | Baslow | 403/401 X |

FOREIGN PATENT DOCUMENTS

| 130061 | 6/1947 | Australia | 40/152.1 |
|---|---|---|---|
| 2442752 | 3/1975 | Fed. Rep. of Germany | 40/152 |

Primary Examiner—John F. Pitrelli

[57] ABSTRACT

A picture frame having four elongated side members positioned together to form a rectangle, projections at each end of each of the side members, four clips each adapted to fasten over the two projections of adjoining side members to fasten such side members for hanging the frame, and means which snap to each side member to retain a picture.

3 Claims, 4 Drawing Figures

U.S. Patent     Dec. 9, 1980     4,237,631
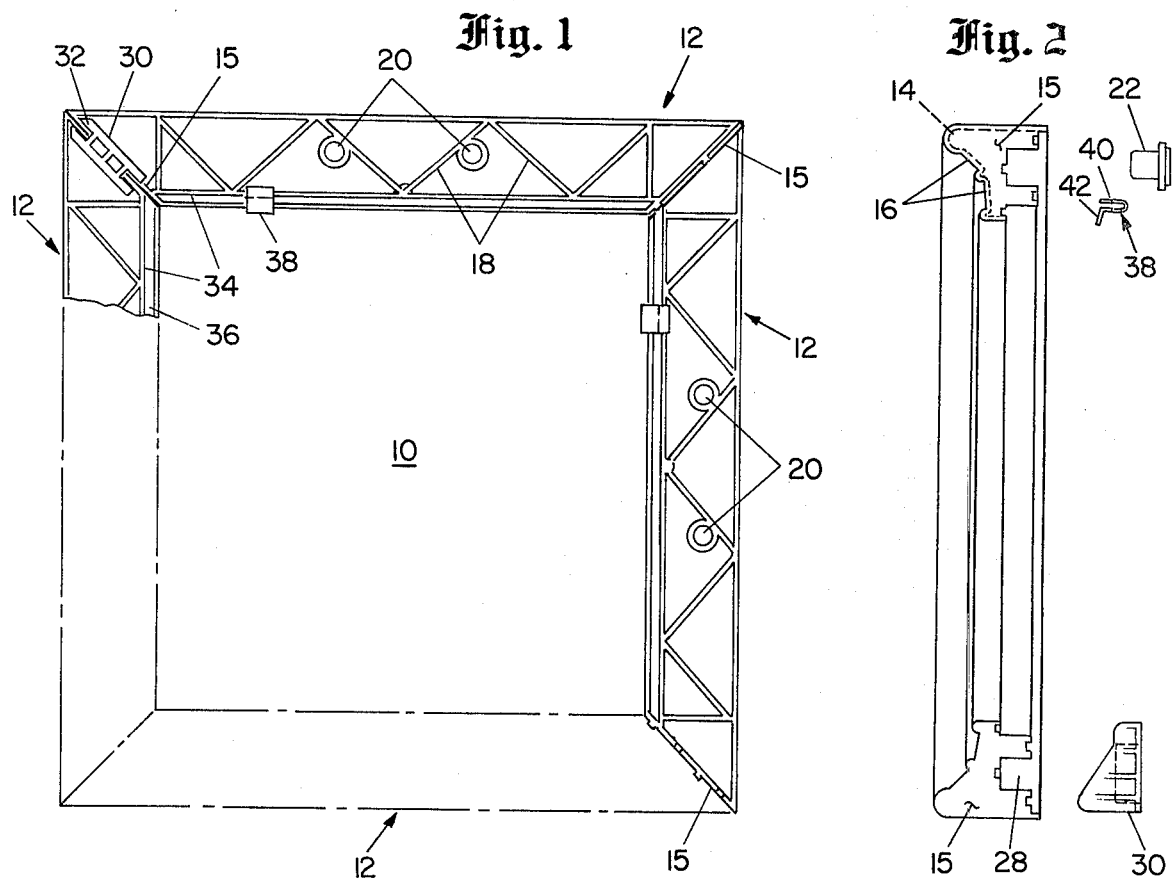
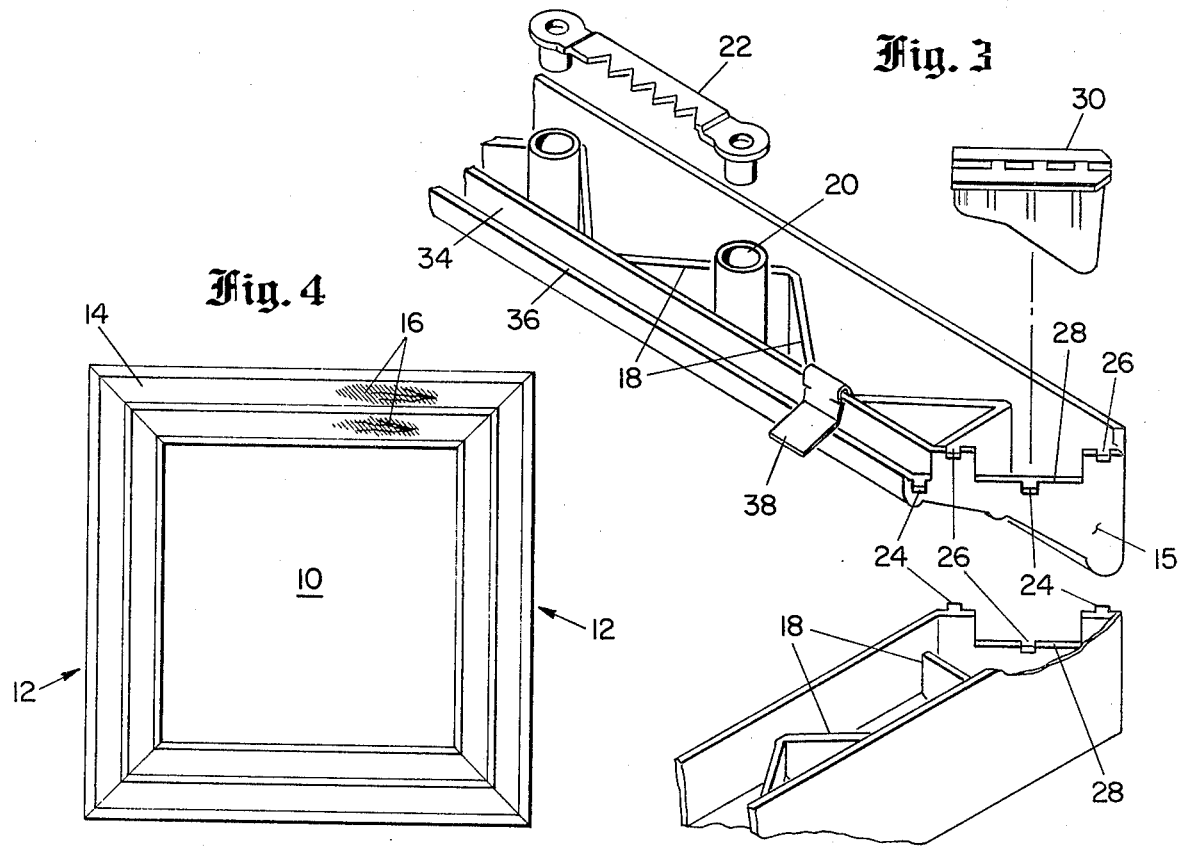

4,237,631

PICTURE FRAME

BACKGROUND OF THE INVENTION

The background of the invention will be discussed in two parts:

Field of the Invention

This invention relates to picture frames, and more particularly, to plastic picture frames which are strong yet quite light, are easy to assemble, and offer many different decorative variations.

Description of the Prior Art

Historically, a picture frame has been constructed by an artisan of substantial ability such as a cabinet maker who shapes a particular piece of wood, cuts it into four precise lengths, joins those lengths together at the corners by some means such as dowling and finishes the frame by sanding and applying a protective coating. When the frame is finished, a piece of cut glass, a picture and a backing may be fitted and secured thereto, and a hanger may be affixed to opposing sides for securing the frame to a wall.

A picture frame so constructed is quite heavy and quite expensive in materials and time. Attempts have been made to improve picture frames by making them in parts which may be assembled by the user. However, frames which may be assembled are still quite heavy if they are to contain large pictures. And although modern frames are known which may be assembled by the user, there are no known frames which may be assembled without the use of tools. In our modern society, many people are not adept at the use of tools. Moreover, such frames, in general, require a substantial amount of skill in order to achieve the precise registration necessary to produce a decent appearance. Consequently, such frames as are available to be assembled by the user tend to be unacceptable when assembled.

It is an object of this invention to provide a new and improved picture frame.

It is another object of this invention to provide a light-weight picture frame which may be used to mount quite large pictures.

It is an additional object of this invention to provide an inexpensive picture frame which may be assembled without the use of tools and which is adapted to be produced in many decorative variations.

SUMMARY OF THE INVENTION

The foregoing and other objects of the invention are accomplished by a picture frame which has four elongated side members which may be, in a particular embodiment, made of a blow-molded plastic material. These side members are formed with 45° ends and are positioned together to form a rectangular frame. Each of the ends includes projections adapted to accurately position the adjoining side members and to receive a clip which connects together adjoining side members securely and accurately without the use of tools. Each of the side members is a generally hollow shell with buttressing walls to provide the strength necessary for holding a large picture. Each of the side members may also be provided with a snap fitting for receiving a hanger which may be secured thereto without the use of tools. A set of unique clips is also provided to be affixed without the use of tools to the back of the frame to retain the glass, picture and any backing material. Such a picture frame is light in weight, able to mount a large picture, quite sturdy, easily and accurately assembled without the use of tools, and quite inexpensive.

Other objects, features and advantages of the invention will become apparent from a reading of the specification taken in conjunction with the drawings in which like reference numbers refer to like elements in the different views.

BRIEF DESCRIPTION OF THE DRAWINGS

FIG. 1 is a back view of a picture frame constructed in accordance with the invention;

FIG. 2 is a side view of one side of the picture frame shown in FIG. 1;

FIG. 3 is an exploded perspective view of two sides of the picture frame shown in FIG. 1, illustrating various details of construction; and FIG. 4 is a front view of the picture frame shown in FIG. 1.

DESCRIPTION OF THE PREFERRED EMBODIMEMT

Referring now to the drawings and, more particularly, to FIG. 1, there is shown a back view of a picture frame 10 constructed in accordance with the invention. The picture frame 10 comprises four elongated side members 12 each of which may be constructed from a plastic material by some well known process such as blow molding. The side members 12 may be of various selected lengths and dimensions; but opposite members 12 will be of the same length, and each member 12 is preferably provided with ends 15 arranged at a 45° angle to its axis. The cross section of each member 12 may be better understood from viewing FIGS. 2 and 3 to include an outer shell 14 which may be provided with a wood grain exterior on its front surface (as shown in FIG. 4) by the particular mold in which the members 12 are manufactured. The particular embodiment illustrated in FIG. 4 also has areas 16 on the front surface of the shell 14 which are adapted to be covered with adhesive strips (not shown) which may provide various forms of colored decoration to aesthetically enhance the particular picture mounted in the frame.

In order to provide superior strength to the picture frame 10 of this invention, each side member 12 is provided with buttressing including walls 18 so positioned and constructed as to provide substantial supporting strength to the outer shell 14. Such strength is sufficient that the frame when constructed and assembled may support quite large pictures without overdue stress or distortion.

Molded into each of the side members 12 are cylinders 20 each projecting with an axis at a right angle to the axis of the elongated side member 12. The cylinders 20 are adapted to receive by press fit a hanger 22 which may be molded from a plastic material and is adapted to provide a snap fit within the cylinders 20.

The side members 12 are secured together first by positioning in such a way that the fingers 24 which are molded into the ends 15 and project at a 90° angle therefrom fit into the recesses 26 in the ends 15 of the adjacent elongated side member 12. The two side members 12 are positioned so that the 45° ends 15 each match one another. Therefore, each of the fingers 24 fits into an adjacent recess 26 and provides positive and accurate matching of the ends 15 one to another. Each of the ends 15 has a second recess 28 cut therein which is adapted to receive a central portion of a clip 30 molded in such a way as to fit over end walls 32 to hold those walls together. The clip 30 as may be seen from FIGS. 2 and 3 has a central portion adapted to mate with recess 28 and is so molded and is of such a material, for example, as to provide for holding the ends 15 tightly in place. In should also be noted that the clip 30 is so formed at the end shown at 32 in FIG. 1, that it forms a wedge against the shell 14 of each of the side members 12 thereby providing substantial additional strength to the picture frame 10.

The clip 30 may be easily placed in position simply by pushing with the thumb while holding two ends 15 in position against each other. When assembling a complete picture frame 10, each of the clips 30 is pushed into a first position where it lightly holds one of the corners together. Once all four corners have been clipped together in this fashion, the clips 30 are depressed into their final positions by additional thumb pressure. When so clipped together, the side members 12 provide a very strong frame for holding pictures of many sizes. Obviously, the size of the picture may be varied by varying the particular side members chosen to be fastened together. For example, if two side members each having an interior dimension of 25 cm. are connected to two other side members each having an interior dimension of 50 cm., a first size frame will be produced. On the other hand, if the two members having an inner dimension of 25 cm. are connected to other side members having an inner dimension of 25 cm. a square frame will be produced. Thus, frames may be produced and sold in various dimensions to suit dimensions normally encountered in paintings.

Once a frame 10 of side members 12 has been assembled, a rectangular space is provided by inner walls 34 which determine the dimensions of the painting which may be mounted. The walls 34 are formed at a right angle to the surface of a lip 36 which is adapted to hold a piece of glass or the painting itself when inserted into the frame 10 from the back. If glass is first inserted, it may be followed by the painting and a piece of backing material such as cardboard and may be held in place by a clip 38 which is adapted to fit over the wall 34 and is of such a shape as to clamp thereagainst. The clip 38 has notches 40 therein which are bent inwardly to provide projecting spurs which will dig into walls 34 and make the removal of the clips 38 quite difficult. The clips 38 have a projecting end 42 which presses against the backing material to hold the picture, glass, and backing material in place.

Thus it will be obvious that the invention disclosed herein is unusually light in weight but quite strong and capable of carrying a substantial load. Furthermore, the invention disclosed is very easy to assemble because of the corner clips which are easily pushed in place by hand, the interlocking corners provide accurate matching of the frame, the snap-on hangers may be placed in position by hand, and the snap-on clips 38 are adapted to hold the glass, painting, and backing in place.

As mentioned above, the shell 14 may be provided with various patterns, such as wood grain, to make the exterior surface thereof quite attractive. The exterior surface may also be provided with recesses such as is shown at 16 in FIG. 4 adapted to receive coated material to provide additional decorative aspects.

While there has been shown and described a preferred embodiment, it is to be understood that other adaptations and modifications may be made within the spirit and scope of the invention.

What is claimed is:

1. A picture frame comprising four side members each having its ends cut at a 45° angle to its length, each of said ends having an end wall adapted to mate with the end wall of the adjoining side member in a manner which locks adjoining members into a coplanar attitude, and means for clipping said end walls together, said side members are each formed of a plastic material with an outer and an inner side wall and a plurality of contiguous buttressing walls secured to said outer and inner side walls and angularly disposed to form a juxtaposed series of triangles which provide strength in torsion, compression, and bending, each of the side members has a pair of cylindrical recesses affixed to a pair of adjacent buttressing walls and positioned perpendicularly to the side member axis and opening to the back thereof, and which further comprises a hanger having projecting cylindrical members adapted to fit into the cylindrical recesses.

2. A picture frame as claimed in claim 1 wherein each of the side members comprises an inner lip adapted to receive a picture and a wall at a right angle adjacent thereto for restricting the movement of a picture, the frame further comprising an L-shaped member adapted to clip over said wall and hold a picture in the frame.

3. A picture frame as claimed in claim 1 wherein said end walls of said side members include both fingers and recesses arranged to permit the fingers on each end wall to mate with corresponding recesses in the adjoining end wall, locking adjoining members into a coplanar attitude and preventing relative motion between adjoining members along an axis parallel to the end walls.

* * * * *